(12) United States Patent
Gao et al.

(10) Patent No.: US 10,303,002 B2
(45) Date of Patent: May 28, 2019

(54) PIXEL STRUCTURE, DRIVING METHOD THEREOF, DISPLAY SUBSTRATE AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Shan Gao, Beijing (CN); Weiyun Huang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/503,292

(22) PCT Filed: Jul. 21, 2016

(86) PCT No.: PCT/CN2016/090804
§ 371 (c)(1),
(2) Date: Feb. 10, 2017

(87) PCT Pub. No.: WO2017/076067
PCT Pub. Date: May 11, 2017

(65) Prior Publication Data
US 2018/0231814 A1    Aug. 16, 2018

(30) Foreign Application Priority Data

Nov. 6, 2015   (CN) .......................... 2015 1 0750515

(51) Int. Cl.
*G09G 3/36* (2006.01)
*G02F 1/133* (2006.01)
(Continued)

(52) U.S. Cl.
CPC .......... *G02F 1/1337* (2013.01); *G02F 1/1362* (2013.01); *G02F 1/1368* (2013.01);
(Continued)

(58) Field of Classification Search
CPC ....... G02F 2001/134345; G02F 1/1337; G02F 1/13306
(Continued)

(56) References Cited

U.S. PATENT DOCUMENTS

2005/0122441 A1   6/2005   Shimoshikiryoh
2005/0253797 A1   11/2005  Kamada et al.
(Continued)

FOREIGN PATENT DOCUMENTS

CN   1694152 A   11/2005
CN   1991463 A   7/2007
(Continued)

OTHER PUBLICATIONS

First Office Action for Chinese Application No. 201510750515.8, dated Sep. 15, 2017, 7 pages.
(Continued)

*Primary Examiner* — Lucy P Chien
(74) *Attorney, Agent, or Firm* — Brooks Kushman P.C.

(57) ABSTRACT

The present disclosure provides a pixel structure, a driving method thereof, a display substrate and a display device. The pixel structure includes a plurality of subpixels arranged on a substrate. Alignment directions of liquid crystals at a region corresponding to the adjacent subpixels in an identical row are not completely identical to each other, and/or alignment directions of liquid crystals at a region corresponding to the adjacent subpixels in an identical column are not completely identical to each other.

19 Claims, 4 Drawing Sheets

(51) Int. Cl.
*G02F 1/1337* (2006.01)
*G02F 1/1362* (2006.01)
*G02F 1/1368* (2006.01)

(52) U.S. Cl.
CPC .......... *G02F 1/13306* (2013.01); *G09G 3/36* (2013.01); *G09G 3/3614* (2013.01); *G02F 2201/121* (2013.01); *G02F 2201/123* (2013.01); *G09G 2300/0426* (2013.01)

(58) Field of Classification Search
IPC ................ G02F 2001/134345,1/1337, 1/13306
See application file for complete search history.

(56) References Cited

U.S. PATENT DOCUMENTS

| | | | |
|---|---|---|---|
| 2007/0165173 | A1 | 7/2007 | Kazuyoshi et al. |
| 2008/0259256 | A1 | 10/2008 | Dong |
| 2009/0284702 | A1* | 11/2009 | Seo ................... G02F 1/133753 349/128 |
| 2010/0014012 | A1 | 1/2010 | Irie et al. |
| 2012/0154724 | A1 | 6/2012 | Yang et al. |
| 2013/0188106 | A1 | 7/2013 | Nishida et al. |

FOREIGN PATENT DOCUMENTS

| | | |
|---|---|---|
| CN | 101290410 A | 10/2008 |
| CN | 101563646 A | 10/2009 |
| CN | 102566157 A | 7/2012 |
| CN | 103135293 A | 6/2013 |
| CN | 105182620 A | 12/2015 |
| CN | 205067928 U | 3/2016 |
| EP | 1538599 A2 | 6/2005 |
| JP | 2008083324 A | 4/2008 |

OTHER PUBLICATIONS

International Search Report and Written Opinion for Application No. PCT/CN2016/090804, dated Sep. 22, 2016, 10 pages.

* cited by examiner

PIXEL STRUCTURE, DRIVING METHOD THEREOF, DISPLAY SUBSTRATE AND DISPLAY DEVICE

CROSS-REFERENCE TO RELATED APPLICATIONS

This application is the U.S. national phase of PCT Application No. PCT/CN2016/090804 filed on Jul. 21, 2016, which claims priority to Chinese Patent Application No. 201510750515.8 filed on Nov. 6, 2015, the disclosures of which are incorporated in their entirety by reference herein.

TECHNICAL FIELD

The present disclosure relates to the field of display technology, in particular to a pixel structure, a driving method thereof, a display substrate and a display device.

BACKGROUND

As a mainstream wide-viewing-angle technology for a thin film transistor liquid crystal display (TFT-LCD), a plane electric field technology has such advantages as simple manufacture process, super wide viewing angle, high aperture ratio and rapid response. However, the LCD of a plane electric field type also has such disadvantages as chromatic aberration and low side viewing angle-contrast.

In the related art, usually a compensation film needs to be added for a liquid crystal display panel, so as to improve the viewing angle-contrast. However, due the additional compensation film, the manufacture cost of the liquid crystal display may inevitably increase.

SUMMARY

An object of the present disclosure is to provide a pixel structure, a driving method thereof, a display substrate and a display device, so as to increase the viewing angle-contrast in the case of not increasing the manufacture cost of the liquid crystal display.

In one aspect, the present disclosure provides in some embodiments a pixel structure including a plurality of subpixels arranged on a substrate. Alignment directions of liquid crystals at a region corresponding to the adjacent subpixels in an identical row are not completely identical to each other, and/or alignment directions of liquid crystals at a region corresponding to the adjacent subpixels in an identical column are not completely identical to each other.

In a possible embodiment of the present disclosure, alignment directions of an alignment layer for the liquid crystals at the region corresponding to the adjacent subpixels in an identical row are not completely identical to each other, and/or alignment directions of an alignment layer for the liquid crystals at the region corresponding to the adjacent subpixels in an identical column are not completely identical to each other.

In a possible embodiment of the present disclosure, each subpixel is a multi-domain subpixel, and at a region corresponding to each subpixel, the alignment directions of the liquid crystals within adjacent domains are different from each other.

In a possible embodiment, each subpixel is a double-domain subpixel.

In a possible embodiment of the present disclosure, the alignment directions of the liquid crystals at the region corresponding to the adjacent subpixels in an identical row are mirror-symmetrical to each other, and/or the alignment directions of the liquid crystals at the region corresponding to the adjacent subpixels in an identical column are mirror-symmetrical to each other.

In a possible embodiment of the present disclosure, the alignment directions of the liquid crystals at the region corresponding to the adjacent subpixels in an identical row are perpendicular to each other, and/or the alignment directions of the liquid crystals at the region corresponding to the adjacent subpixels in an identical column are perpendicular to each other.

In a possible embodiment of the present disclosure, the alignment directions of the liquid crystals at the region corresponding to the adjacent subpixels in an identical row are perpendicular to each other, and the alignment directions of the liquid crystals at the region corresponding to the adjacent subpixels in an identical column are perpendicular to each other.

In a possible embodiment of the present disclosure, a plurality of gate lines is arranged on the substrate, and each gate line is arranged between two adjacent rows of the subpixels. Each even-numbered gate line is connected to subpixels in the two adjacent rows of the subpixels, and the alignment direction of the liquid crystals at a region corresponding to these subpixels is a first direction. Each odd-numbered gate line is connected to subpixels in the two adjacent rows of the subpixels, and the alignment direction of the liquid crystals at a region corresponding to these subpixels is a second direction perpendicular to the first direction.

In a possible embodiment of the present disclosure, pixel electrodes of two adjacent subpixels connected to an identical gate line are mirror-symmetrical to each other.

In a possible embodiment of the present disclosure, a plurality of data lines is further arranged on the substrate, and each data line is arranged between two adjacent columns of the subpixels. Each even-numbered data line is connected to subpixels in the two adjacent columns of the subpixels, and the alignment direction of the liquid crystals at a region corresponding to these subpixels is a first direction. Each odd-numbered data line is connected to subpixels in the two adjacent columns of the subpixels, and the alignment direction of the liquid crystals at a region corresponding to these subpixels is a second direction perpendicular to the first direction.

In a possible embodiment of the present disclosure, pixel electrodes of the two adjacent subpixels connected to an identical data line are mirror-symmetrical to each other.

In another aspect, the present disclosure provides in some embodiments a display substrate including the above-mentioned pixel structure.

In yet another aspect, the present disclosure provides in some embodiments a display device including the above-mentioned display substrate.

In still yet another aspect, the present disclosure provides in some embodiments a method for driving the above-mentioned pixel structure, including a step of driving subpixels with liquid crystals having an alignment direction in accordance with a viewing angle-contrast, to display an image, wherein the alignment direction corresponds to the viewing angle-contrast.

In a possible embodiment of the present disclosure, the subpixels of the pixel structure are double-domain subpixels including vertical double-domain subpixels and transverse double-domain subpixels. The step of driving the subpixels with liquid crystals having an alignment direction in accordance with a viewing angle-contrast to display an image includes: in the case of displaying the image at a high contrast in a vertical direction, applying a high voltage to a pixel electrode of each vertical double-domain subpixel; in the case of displaying the image at a high contrast in a transverse direction, applying a high voltage to a pixel electrode of each transverse double-domain subpixel; and in the case of displaying the image at a high contrast in both the vertical and transverse directions, applying a high voltage to the pixel electrodes of all the subpixels.

According to the embodiments of the present disclosure, for the plurality of multi-domain subpixels arranged on the substrate, the alignment directions of the liquid crystals at the region corresponding to the adjacent subpixels in an identical row are not completely identical to each other, and/or the alignment directions of the liquid crystals at the region corresponding to the adjacent subpixels in an identical column are not completely identical to each other. In this way, it is to provide the high contrast at a plurality of viewing angles in the case of no compensation film. In addition, through driving the subpixels corresponding to the specific alignment direction of the liquid crystals, it is also able to separately provide the high contrast in the transverse or vertical direction.

REFERENCE SIGN LIST

Figure 1:
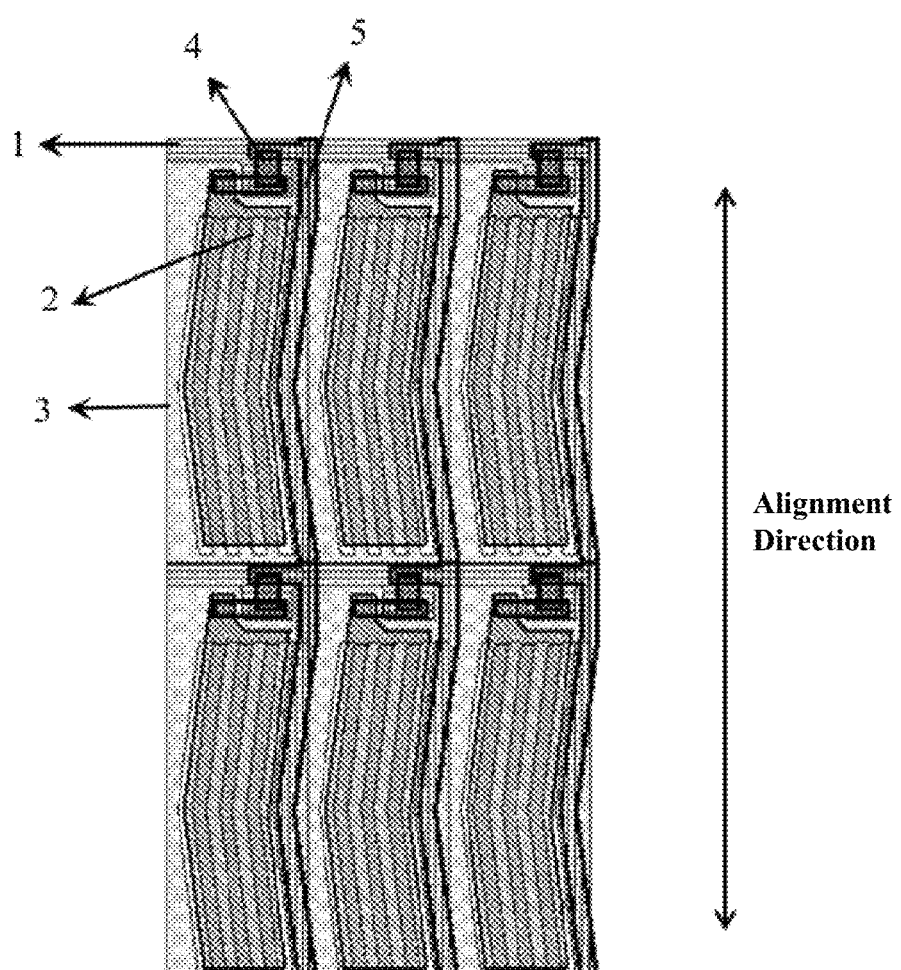
FIG. 1 is a schematic view showing a vertical double-domain pixel structure and an arrangement mode thereof.

1 gate electrode
2 pixel electrode
3 common electrode
4 active layer
5 source electrode and drain electrode

DETAILED DESCRIPTION

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the related art, a LCD of a plane electric field type has such disadvantages as chromatic aberration and low side viewing angle-contrast. The present disclosure provides in some embodiments a pixel structure, a driving method thereof, a display substrate and a display device, so as to improve the viewing angle-contrast in the case of not increasing the manufacture cost of the LCD.

The present disclosure provides in some embodiments a pixel structure including a plurality of subpixels arranged on a substrate. Alignment directions of liquid crystals at a region corresponding to the adjacent subpixels in an identical row are not completely identical to each other, and/or alignment directions of liquid crystals at a region corresponding to the adjacent subpixels in an identical column are not completely identical to each other.

In the embodiments of the present disclosure, among the plurality of multi-domain subpixels on the substrate, the alignment directions of the liquid crystals at the region corresponding to the adjacent subpixels in an identical row are not completely identical to each other, and/or the alignment directions of the liquid crystals at the region corresponding to the adjacent subpixels in an identical column are not completely identical to each other. In this way, it is able to provide the high contrast at a plurality of viewing angles in the case of no compensation film. In addition, through driving the subpixels corresponding to the specific alignment direction of the liquid crystals, it is also able to separately provide the high contrast in a transverse or vertical direction.

In a possible embodiment of the present disclosure, alignment directions of an alignment layer for the liquid crystals at the region corresponding to the adjacent subpixels in an identical row are not completely identical to each other, and/or alignment directions of an alignment layer for the liquid crystals at the region corresponding to the adjacent subpixels in an identical column are not completely identical to each other.

In a possible embodiment of the present disclosure, each subpixel is a multi-domain subpixel, and at a region corresponding to each subpixel, the alignment directions of the liquid crystals within adjacent domains are different from each other, which can further improve the viewing angle contrast.

In a possible embodiment, each subpixel is a double-domain subpixel.

In a possible embodiment of the present disclosure, the alignment directions of the liquid crystals at the region corresponding to the adjacent subpixels in an identical row are mirror-symmetrical to each other, and/or the alignment directions of the liquid crystals at the region corresponding to the adjacent subpixels in an identical column are mirror-symmetrical to each other. In this way, it is able to provide the high contrast at two viewing angles mirror-symmetrical to each other.

In a possible embodiment of the present disclosure, the alignment directions of the liquid crystals at the region corresponding to the adjacent subpixels in an identical row are perpendicular to each other, or the alignment directions of the liquid crystals at the region corresponding to the adjacent subpixels in an identical column are perpendicular to each other. In this way, it is able to provide the high contrast at two viewing angles perpendicular to each other.

In a possible embodiment of the present disclosure, the alignment directions of the liquid crystals at the region corresponding to the adjacent subpixels in an identical row are perpendicular to each other, and the alignment directions of the liquid crystals at the region corresponding to the adjacent subpixels in an identical column are perpendicular to each other. In this way, it is able to simultaneously provide the high contrast at two viewing angles perpendicular to each other.

In a possible embodiment of the present disclosure, a plurality of gate lines is arranged on the substrate, and each gate line is arranged between two adjacent rows of the subpixels. Each even-numbered gate line is connected to subpixels in the two adjacent rows of the subpixels, and the alignment direction of the liquid crystals at a region corresponding to these subpixels is a first direction. Each odd-numbered gate line is connected to subpixels in the two adjacent rows of the subpixels, and the alignment direction of the liquid crystals at a region corresponding to these subpixels is a second direction perpendicular to the first direction. In this way, in the case of driving each subpixel, it is able to provide the high contrast at the viewing angle in the first direction through driving the even-numbered gate lines, and provide the high contrast at the viewing angle in the second direction through driving the odd-numbered gate lines.

In a possible embodiment of the present disclosure, pixel electrodes of two adjacent subpixels connected to an identical gate line are mirror-symmetrical to each other. In this way, it is able to achieve brightness equalization and color equalization for the LCD.

In a possible embodiment of the present disclosure, a plurality of data lines is further arranged on the substrate, and each data line is arranged between two adjacent columns of the subpixels. Each even-numbered data line is connected to subpixels in the two adjacent columns of the subpixels, and the alignment direction of the liquid crystals at a region corresponding to these subpixels is a first direction. Each odd-numbered data line is connected to subpixels in the two adjacent columns of the subpixels, and the alignment direction of the liquid crystals at a region corresponding to these subpixels is a second direction perpendicular to the first direction. In this way, in the case of driving each subpixel, it is able to provide the high contrast at the viewing angle in the first direction through driving the even-numbered data lines, and provide the high contrast at the viewing angle in the second direction through driving the odd-numbered data lines.

In a possible embodiment of the present disclosure, pixel electrodes of the two adjacent subpixels connected to an identical data line are mirror-symmetrical to each other. In this way, it is able to achieve brightness equalization and color equalization for the LCD.

The present disclosure further provides in some embodiments a display substrate including the above-mentioned pixel structure. The display substrate may be applied to a liquid crystal display panel.

The present disclosure further provides in some embodiments a display device including the above-mentioned display substrate. The structure of the display substrate is mentioned above, and thus will not be particularly defined herein. The structures of the other members in the display device are known in the art, and thus will not be particularly defined. The display device may be any product or member having a display function, such as a liquid crystal panel, an electronic paper, a liquid crystal television, a LCD, a digital photo frame, a mobile phone or a flat-panel computer.

The present disclosure further provides in some embodiments a method for driving the pixel structure, including a step of driving subpixels with liquid crystals having an alignment direction in accordance with a viewing angle-contrast, to display an image, wherein the alignment direction corresponds to the viewing angle-contrast.

According to the embodiments of the present disclosure, among the plurality of multi-domain subpixels on the substrate, the alignment directions of the liquid crystals at the region corresponding to the adjacent subpixels in an identical row are not completely the same, and/or the alignment directions of the liquid crystals at the region corresponding to the adjacent subpixels in an identical column are not completely the same. In this way, it is able to provide the high contrast at a plurality of viewing angles in the case of no compensation film. In addition, through driving the subpixels corresponding to the specific alignment direction of the liquid crystals, it is also able to separately provide the high contrast in a transverse or vertical direction.

In order to improve the chromatic aberration, double-domain display may be adopted. The so-called "double-domain display" refers to that each subpixel may be further divided into two different regions and the liquid crystals corresponding to the two regions may be deflected at different levels. In the case that an image displayed on the liquid crystal display panel is viewed at different angles, a combined effect may be obtained in accordance with the deflection levels of the liquid crystals at the two regions. As a result, it is able to reduce the difference in the contrast at different angles due to the same deflection level of the liquid crystals at the region corresponding to each subpixel, thereby to reduce the chromatic aberration and enhance the viewing angle. Currently, there are two double-domain pixel structures, i.e., a vertical double-domain pixel structure and a transverse double-domain pixel structure. For the two pixel structures, rubbing directions (alignment directions of the liquid crystals) are perpendicular to each other.

FIG. 1 shows the vertical double-domain pixel structure and an arrangement mode thereof. The pixel structure includes a gate electrode 1, a pixel electrode 2, a common electrode 3, an active layer 4 and a source/drain electrode 5. As shown in FIG. 1, a rubbing direction for the vertical double-domain pixel structure is parallel to a long side of each subpixel. Through this pixel structure, in the case of no additional compensation film, the contrast at two viewing angles in a direction parallel to a short side of each subpixel is relatively low, and the contrast at the two viewing angles in a direction parallel to the long side of each subpixel is relatively high.

Figure 2:
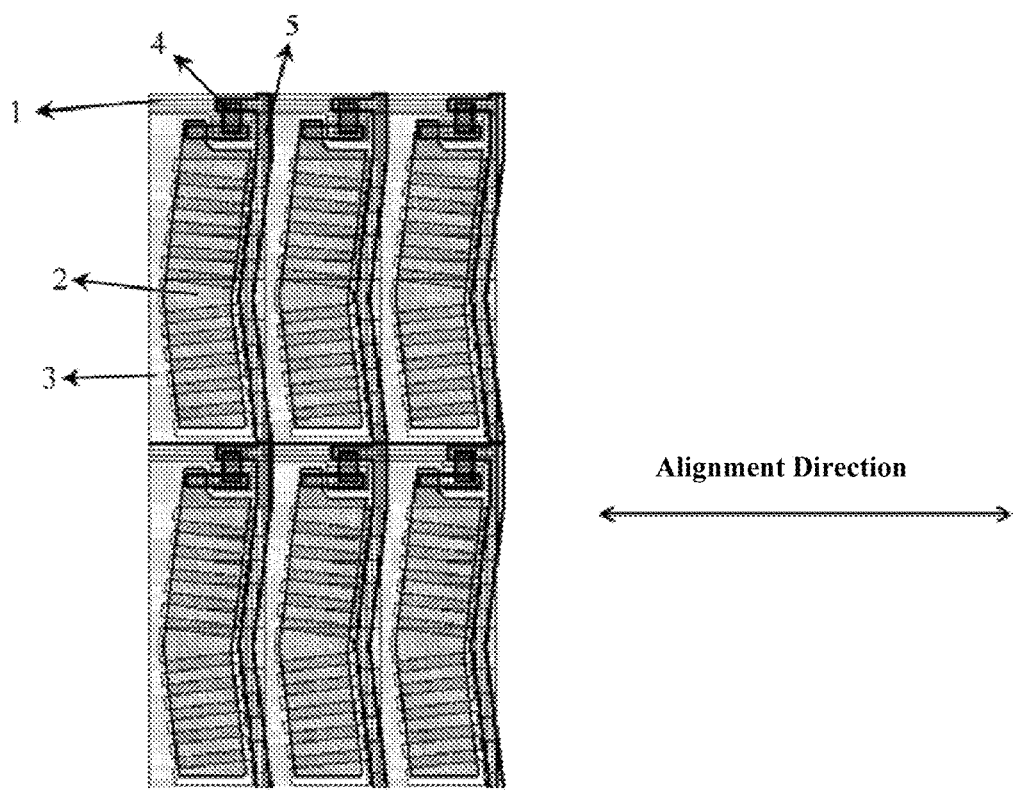
FIG. 2 is a schematic view showing a transverse double-domain pixel structure and an arrangement mode thereof.

FIG. 2 shows a transverse double-domain pixel structure and an arrangement mode thereof. The pixel structure includes the gate electrode 1, the pixel electrode 2, the common electrode 3, the active layer 4 and the source/drain electrode 5. As shown in FIG. 2, a rubbing direction for the transverse double-domain pixel structure is parallel to the short side of each subpixel. Through this pixel structure, in the case of no additional compensation film, the contrast at the two viewing angles in a direction parallel to the short side of each subpixel is relatively high, and the contrast at the two viewing angles in a direction parallel to the long side of each subpixel is relatively low.

Figure 3:
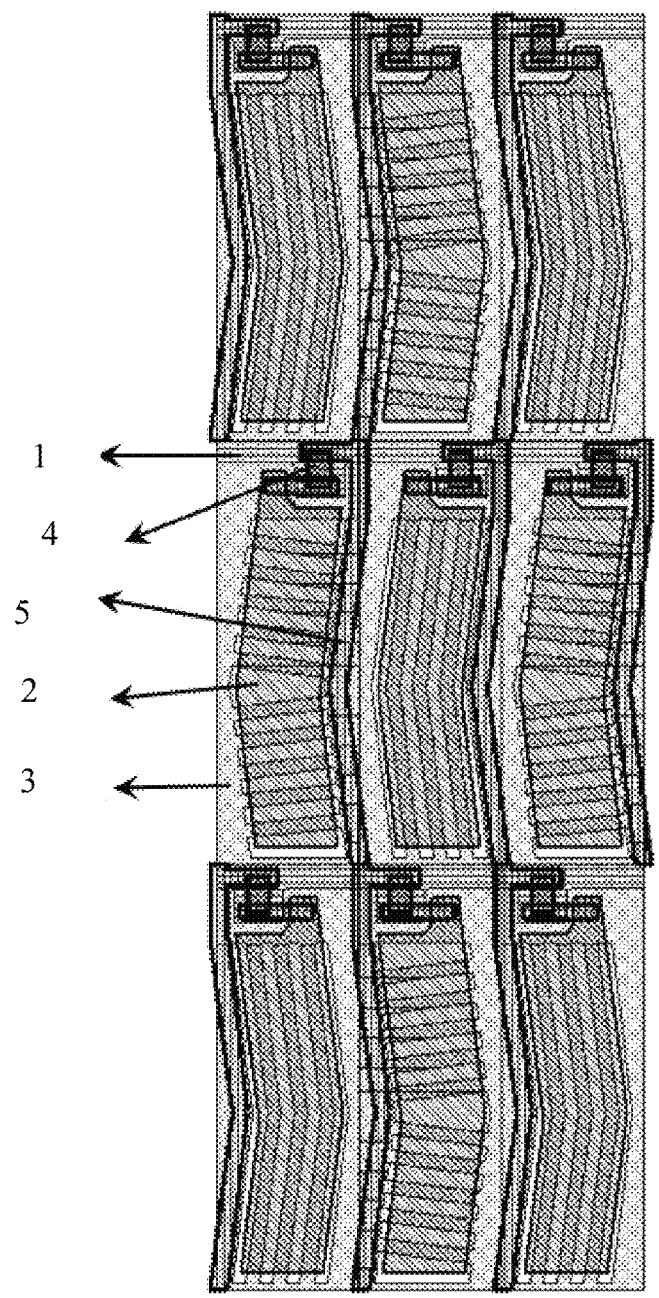
FIG. 3 is a schematic view showing a pixel structure and an arrangement mode thereof according to one embodiment of the present disclosure.

However, it is merely able for the above-mentioned display panel to provide the high contrast at the two viewing angles, rather than to separately and randomly adjust the high contrast at the other viewing angles. As shown in FIG. 3, in the embodiments of the present disclosure, the pixel structure includes a plurality of subpixels arranged in a matrix form on a substrate. Each subpixel is a double-domain subpixel, and alignment directions of liquid crystals within adjacent domains are different from each other. The alignment directions of the liquid crystals at a region corresponding to the adjacent subpixels in an identical row are perpendicular to each other, and the alignment directions of the liquid crystals at a region corresponding to the adjacent subpixels in an identical column are perpendicular to each other. A plurality of data lines is further arranged on the substrate, and each data line is arranged between two adjacent columns of the subpixels. Pixel electrodes of adjacent subpixels, the alignment direction of the liquid crystals at a region corresponding to which are identical to each other, are arranged mirror-symmetrical to each other relative to the corresponding data line. Each even-numbered data line is connected to subpixels in the two adjacent columns of the subpixels, and the alignment direction of the liquid crystals at a region corresponding to these subpixels is a first direction. Each odd-numbered data line is connected to subpixels in the two adjacent columns of the subpixels, and the alignment direction of the liquid crystals at a region corresponding to these subpixels is a second direction perpendicular to the first direction.

In the embodiments of the present disclosure, there are various alignment directions of the liquid crystals, so it is necessary to achieve these various alignment directions through an optically-controlled alignment technique, rather than through rubbing.

Figure 4:
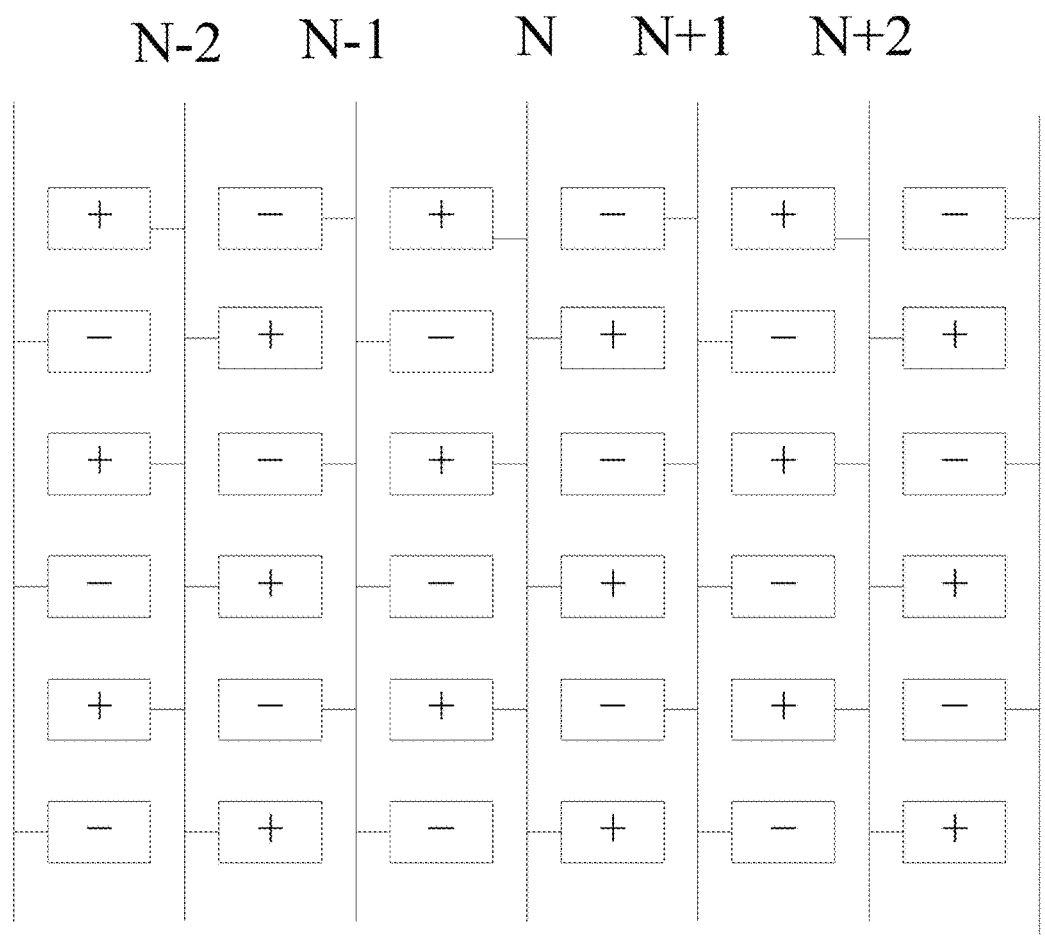
FIG. 4 is a schematic view showing polarities of subpixels in the case of displaying an image according to one embodiment of the present disclosure.

As shown in FIG. 4, sign "+" represents the vertical double-domain subpixels, and sign "−" represents the transverse double-domain subpixels. In the case that it is necessary to provide the high contrast of the display device at the viewing angles in the vertical direction, a high voltage may be applied to the pixel electrodes of the subpixels with the sign "+", i.e., a high voltage may be applied to the data lines N−2, N, and N+2. In the case that it is necessary to provide the high contrast of the display device at the viewing angles in the transverse direction, a high voltage may be applied to the pixel electrodes of the subpixels with the sign "−", i.e., a high voltage may be applied to the data lines N−1 and N+1. In the case that it is necessary to provide the high contrast at the viewing angles in both the transverse and vertical directions, a high voltage may be applied to the pixel electrode of all the subpixels, i.e., a high voltage may be applied to all the data lines.

Identically, in the case that the sign "+" represents the transverse double-domain subpixel and the sign "−" represents the vertical double-domain subpixel, a high voltage may be applied to the pixel electrodes of the subpixels with the sign "+", i.e., a high voltage may be applied to the data lines N−2, N and N+2, so as to provide the high contrast at the viewing angles in the transverse direction. Further, a high voltage may be applied to the pixel electrodes of the subpixels with the sign "−", i.e., a high voltage may be applied to the data lines N−1 and N+1, so as to provide the high contrast at the viewing angles in the vertical direction. In addition, a high voltage may be applied to the pixel electrodes of all the subpixels, i.e., a high voltage may be applied to all the data lines, so as to provide the high contrast at the viewing angles in both the vertical and transverse directions.

According to the embodiments of the present disclosure, it is able to provide the high contrast at various viewing directions in the case of no additional compensation film. In addition, through driving the subpixels corresponding to the specific alignment directions of the liquid crystals, it is able to separately provide the high contrast at the viewing angles in the vertical or transverse direction according to the practical need.

The present disclosure further provides in some embodiments a method for manufacturing the display substrate, which includes the following steps.

Step a: providing a base substrate, and forming patterns of the gate electrode 1 and the gate line on the base substrate through a single patterning process.

Step b: forming a gate insulation layer on the base substrate obtained after Step a.

Step c: forming a pattern of the active layer 4 on the base substrate obtained after Step b.

Step d: depositing a first transparent conductive layer onto the base substrate obtained after Step c, and forming the pixel electrode 2.

Step e: depositing a source/drain metal layer onto the base substrate obtained after Step d, and forming source/drain electrodes 5 and the data line. The drain electrode is connected to the pixel electrode 2.

Step f: forming a passivation layer on the base substrate obtained after Step e. In order to increase light transmittance of the display device as possible, the passivation layer may be made of organic resin.

Step g: depositing a second transparent conductive layer onto the base substrate obtained after Step f, and forming the common electrode 3.

The display substrate in the embodiments of the present disclosure may be acquired through the above-mentioned Steps a to g.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel structure, comprising a plurality of subpixels arranged on a substrate,
   wherein alignment directions of liquid crystals at a region corresponding to the adjacent subpixels in an identical row are perpendicular to each other, and alignment directions of the liquid crystals at a region corresponding to the adjacent subpixels in an identical column are perpendicular to each other,
   wherein a plurality of gate lines is arranged on the substrate, and each gate line is arranged between two adjacent rows of the subpixels;
   each gate line in an even-numbered row is connected to first subpixels in the two adjacent rows of the subpixels, wherein the alignment direction of the liquid crystals at a region corresponding to the first subpixels is a first direction; and
   each gate line in an odd-numbered row is connected to second subpixels in the two adjacent rows of the subpixels, wherein the alignment direction of the liquid crystals at a region corresponding to the second subpixels is a second direction perpendicular to the first direction.

2. The pixel structure according to claim 1, wherein alignment directions of an alignment layer for the liquid crystals at the region corresponding to the adjacent subpixels in an identical row are different from each other, or
   alignment directions of an alignment layer for the liquid crystals at the region corresponding to the adjacent subpixels in an identical column are different from each other, or
   alignment directions of an alignment layer for the liquid crystals at the regions corresponding to the adjacent subpixels in an identical row are different from each other and alignment directions of an alignment layer for the liquid crystals at the regions corresponding to the adjacent subpixels in an identical column are different from each other.

3. The pixel structure according to claim 2, wherein each subpixel is a multi-domain subpixel, and at a region corresponding to each subpixel, the alignment directions of the liquid crystals within adjacent domains are different from each other.

4. The pixel structure according to claim 3, wherein each subpixel is a double-domain subpixel.

5. The pixel structure according to claim 1, wherein pixel electrodes of two adjacent subpixels connected to an identical gate line are mirror-symmetrical to each other.

6. The pixel structure according to claim 1, wherein a plurality of data lines is further arranged on the substrate, and each data line is arranged between two adjacent columns of the subpixels;
each data line in an even-numbered column is connected to first subpixels in the two adjacent columns of the subpixels wherein the alignment direction of the liquid crystals at a region corresponding to the first subpixels is a first direction; and
each data line in an odd-numbered column is connected to second subpixels in the two adjacent columns of the subpixels wherein the alignment direction of the liquid crystals at a region corresponding to the second subpixels is a second direction perpendicular to the first direction.

7. The pixel structure according to claim 6, wherein pixel electrodes of the two adjacent subpixels connected to an identical data line are mirror-symmetrical to each other.

8. A display substrate, comprising the pixel structure according to claim 1.

9. A display device, comprising the display substrate according to claim 8.

10. A method for driving the pixel structure according to claim 1, comprising a step of driving subpixels with liquid crystals having an alignment direction in accordance with a viewing angle-contrast to display an image, wherein the alignment direction corresponds to the viewing angle-contrast.

11. The method according to claim 10, wherein the subpixels of the pixel structure are double-domain subpixels comprising vertical double-domain subpixels and transverse double-domain subpixels, and
the step of driving the subpixels with liquid crystals having an alignment direction in accordance with a viewing angle-contrast to display an image comprises:
in the case of displaying the image at a high contrast in a vertical direction, applying a high voltage to a pixel electrode of each vertical double-domain subpixel;
in the case of displaying the image at a high contrast in a transverse direction, applying a high voltage to a pixel electrode of each transverse double-domain subpixel; and
in the case of displaying the image at a high contrast in both the vertical and transverse directions, applying a high voltage to the pixel electrodes of all the subpixels.

12. The display substrate according to claim 8, wherein alignment directions of an alignment layer for the liquid crystals at the region corresponding to the adjacent subpixels in an identical row are different from each other, or
alignment directions of an alignment layer for the liquid crystals at the region corresponding to the adjacent subpixels in an identical column are different from each other, or
alignment directions of an alignment layer for the liquid crystals at the regions corresponding to the adjacent subpixels in an identical row are different from each other and alignment directions of an alignment layer for the liquid crystals at the regions corresponding to the adjacent subpixels in an identical column are different from each other.

13. The display substrate according to claim 12, wherein each subpixel is a multi-domain subpixel, and at a region corresponding to each subpixel, the alignment directions of the liquid crystals within adjacent domains are different from each other.

14. The display substrate according to claim 13, wherein each subpixel is a double-domain subpixel.

15. A pixel structure, comprising a plurality of subpixels arranged on a substrate,
wherein alignment directions of liquid crystals at a region corresponding to the adjacent subpixels in an identical row are perpendicular to each other, and alignment directions of the liquid crystals at a region corresponding to the adjacent subpixels in an identical column are perpendicular to each other,
wherein a plurality of data lines is further arranged on the substrate, and each data line is arranged between two adjacent columns of the subpixels;
each data line in an even-numbered column is connected to first subpixels in the two adjacent columns of the subpixels, wherein the alignment direction of the liquid crystals at a region corresponding to the first subpixels is a first direction; and
each data line in an odd-numbered column is connected to second subpixels in the two adjacent columns of the subpixels, wherein the alignment direction of the liquid crystals at a region corresponding to the second subpixels is a second direction perpendicular to the first direction.

16. The pixel structure according to claim 15, wherein pixel electrodes of the two adjacent subpixels connected to an identical data line are mirror-symmetrical to each other.

17. The pixel structure according to claim 15, wherein a plurality of gate lines is arranged on the substrate, and each gate line is arranged between two adjacent rows of the subpixels;
each gate line in an even-numbered row is connected to first subpixels in the two adjacent rows of the subpixels, wherein the alignment direction of the liquid crystals at a region corresponding to the first subpixels is a first direction; and
each gate line in an odd-numbered row is connected to second subpixels in the two adjacent rows of the subpixels, wherein the alignment direction of the liquid crystals at a region corresponding to the second subpixels is a second direction perpendicular to the first direction.

18. The pixel structure according to claim 1, wherein the adjacent subpixels in an identical row are connected to different gate lines.

19. The pixel structure according to claim 6, wherein the adjacent subpixels in an identical column are connected to different data lines.

* * * * *